(12) United States Patent
Huang

(10) Patent No.: US 7,433,183 B2
(45) Date of Patent: Oct. 7, 2008

(54) ROTATIONAL RETAINING MECHANISM FOR STORAGE DEVICE

(75) Inventor: Ya-Chi Huang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 344 days.

(21) Appl. No.: 11/320,647

(22) Filed: Dec. 30, 2005

(65) Prior Publication Data

US 2007/0151936 A1  Jul. 5, 2007

(51) Int. Cl.
H05K 5/00 (2006.01)
H05K 7/00 (2006.01)
H05K 7/16 (2006.01)
A47B 81/00 (2006.01)
A47B 97/00 (2006.01)

(52) U.S. Cl. .................. 361/685; 361/683; 361/686; 361/724; 361/725; 361/726; 312/223.2

(58) Field of Classification Search ......... 361/683–686, 361/724–726; 312/223.2, 223.3
See application file for complete search history.

(56) References Cited

U.S. PATENT DOCUMENTS 6,111,754 A * 8/2000 Abbott et al. ............... 361/724
6,233,152 B1 * 5/2001 Abbott et al. ............... 361/725
6,473,295 B2 * 10/2002 Chen ........................... 361/683
6,862,172 B2 * 3/2005 Erickson et al. ............. 361/685
7,257,827 B2 * 8/2007 Lee ............................ 720/653
2003/0193782 A1 * 10/2003 Chen ........................... 361/726
2006/0285282 A1 * 12/2006 Chen ........................... 361/679

* cited by examiner

Primary Examiner—Jayprakash N Gandhi
Assistant Examiner—Anthony M Haughton
(74) Attorney, Agent, or Firm—Rabin & Berdo, P.C.

(57) ABSTRACT

A rotational retaining mechanism for storage devices allows storage devices to be unlocked quickly in a rotatable way thereby enlarging the operating space in a housing. The rotational retaining mechanism includes a housing, a modular frame for receiving storage devices and a retaining buckle. The housing has a bottom board, a stopping part protruded upwardly from the bottom board, and a front board. The front board has a receiving entry and a pair of pivotal parts respectively formed at two sides thereof. The module frame has a pair of pivotal parts for mounting pivotally with the pivotal parts of the housing, a holding tab, and a clipping part. The holding tab is held by the stopping part of the housing, when the module frame is opened. The retaining buckle is positioned on the housing and clipped with the clipping part when the modular frame is closed.

16 Claims, 11 Drawing Sheets

ROTATIONAL RETAINING MECHANISM FOR STORAGE DEVICE

BACKGROUND OF THE INVENTION

1. Field of the Invention

The present invention relates to a rotational retaining mechanism for storage devices, and more particularly, to a retaining mechanism for fixing a storage device (such as a CD-ROM drive, a HD (hard disk) drive, or a card reader) in a rotatable and movable way in a host housing.

2. Description of the Prior Art

Storage devices in a conventional computer casing, such as a CD-ROM drive, a HD drive, a FD (floppy disk) drive or a card reader, are almost always fixed in frames of the host casing and are not movable. Sometimes there is a need to dismount the storage devices from the host casing to get more operating space during assembly or maintenance of the computer. The dismounting processes for the above-mentioned storage devices are time-consuming and the screws are easily lost after dismounting. Sometimes it is even difficult to assemble the storage devices back in place.

Therefore, the retaining mechanism for storage devices of the prior art is still somewhat inconvenient and can be improved upon. The inventor, after investigation and research, thus provides the present invention of logical design for improving the above-mentioned imperfections.

SUMMARY OF THE INVENTION

The present invention provides a rotational retaining mechanism for storage devices, which has a movable and rotatable retaining mechanism for enlarging the operating space during maintenance and assembly that enables the storage devices to be unlocked quickly from a locked condition for raising the efficiency of maintenance and assembly.

In addition, the rotational retaining mechanism for storage devices of the prevent invention further provides a safeguarding design to prevent dangerous operations taking place after the storage devices have been unlocked.

To achieve the above objects, the present invention provides a rotational retaining mechanism for storage devices, which includes a housing, a modular frame and a retaining buckle. The housing has a bottom board, a stopping part protruded upwardly form the bottom board, and a front board protruded from a front edge of the bottom board. The front board has a receiving entry and a pair of pivotal parts respectively disposed at two sides of the receiving entry. The modular frame receives at least one storage device therein, and has a pair of pivotal parts protruded from a front edge thereof and pivotally mounted with the pair of pivotal parts of the housing, a holding tab disposed at a side thereof, and a clipping part formed at a side thereof. The holding tab is fixed at the stopping part of the housing when the modular frame is swiveled openly. The retaining buckle is mounted on the housing. The retaining buckle is engaged with the clipping part when the modular frame is swiveled closed.

To provide a further understanding of the invention, the following detailed description illustrates embodiments and examples of the invention, this detailed description being provided only for illustration of the invention.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE EMBODIMENTS

Figure 1:
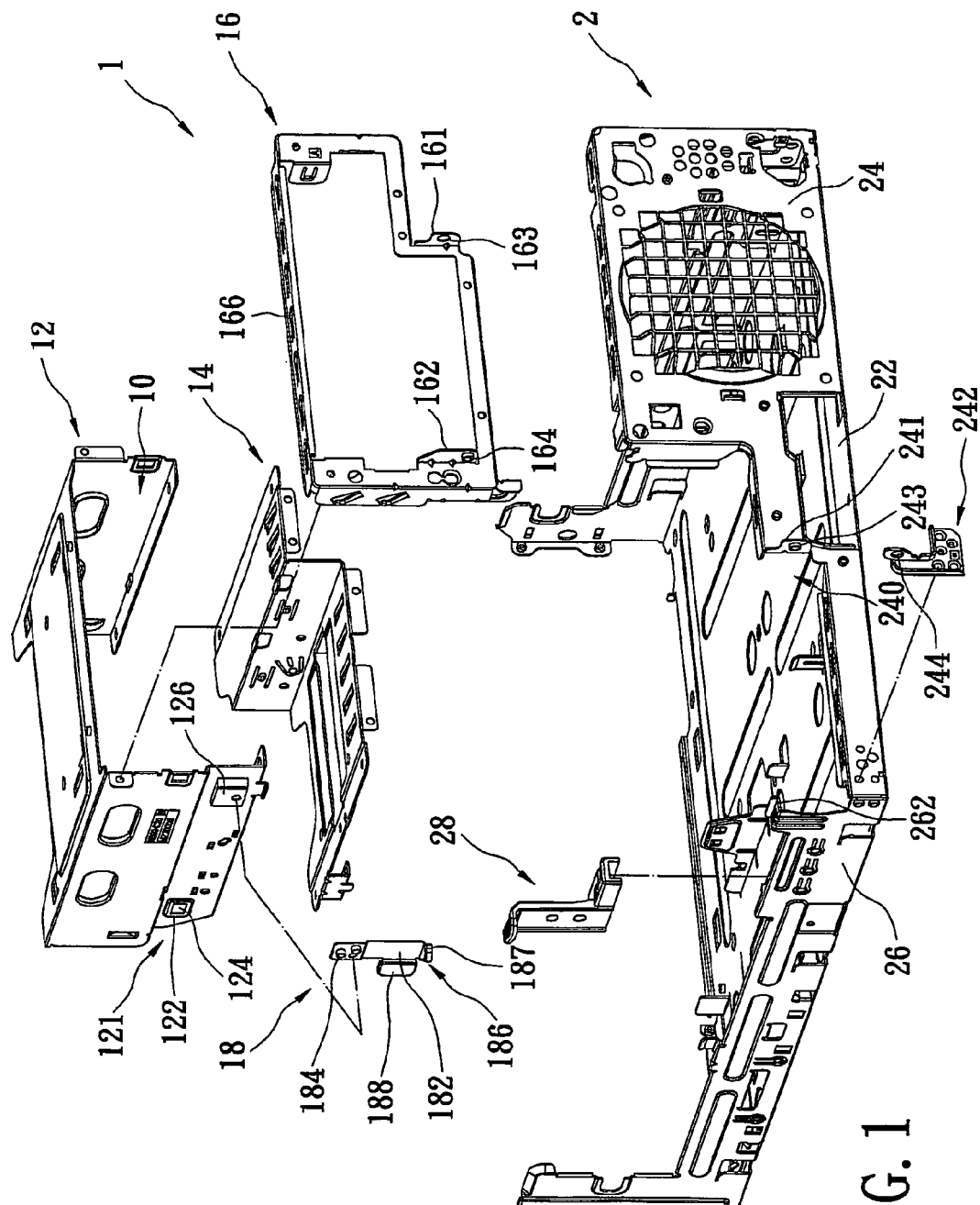
FIG. 1 is an exploded perspective view of a rotational retaining mechanism for storage devices according to the present invention.

Reference is made to FIGS. 1 to 4, which are perspective views of a rotational retaining mechanism for storage devices according to the present invention. The present invention provides a rotational retaining mechanism for storage devices, which includes a modular frame 1 for receiving storage devices (not shown), a housing 2 for receiving the modular frame 1, and a retaining buckle 28 for fixing the modular frame 1 in the housing 2. The housing 2 can be a part of computer host casing. The present invention is especially adapted to a miniature casing, wherein the modular frame 1 is rotatably mounted in the housing 2 so that the operating space for maintenance and assembly is enlarged for the user.

The housing 2 has a bottom board 22, a stopping part 262 protruded upwardly from the bottom board 22, and a front board 24 protruded from a front edge of the bottom board 22. In this embodiment, the housing 2 further includes a side board 26 protruded from one side of the bottom board 22 contiguous with the front board 24. The stopping part 262 protrudes upwardly and inwardly from the side board 26. The front board 24 forms a receiving entry 240 for receiving the modular frame 1, and a pair of pivotal parts 241, 242 respectively formed thereon and disposed at two sides of the receiving entry 240.

The modular frame 1 is used to fix at least one storage device, such as a CD-ROM drive, a HD drive, a FD (floppy disk) drive or a card reader, and the storage device can be withdrawn from the modular frame 1 or fixedly screwed to the modular frame 1. In this embodiment, the modular frame 1 has an upper frame 12, a lower frame 14 connected to a is bottom of the upper frame 12, and a front frame 16 connected to a front edge of the upper frame 12 and a front edge of the lower frame 14. At least one receiving space 10 is formed in the modular frame 1 for receiving the storage device. The front frame 16 forms a plurality of contacting tabs 166 along an edge thereof for preventing EMI.

The modular frame 1 has a pair of pivotal parts 161, 162 formed at a front edge thereof, a holding tab 18 formed at one side thereof, and a clipping part 121 formed at one side thereof. The pair of pivotal parts 161, 162 are pivotally mounted with the pair of pivotal parts 241, 242 of the housing 2, respectively. The holding tab 18 is clipped with the stopping part 262 of the housing 2, when the modular frame 1 is swiveled open. In this embodiment, the pair of pivotal parts 161, 162 are formed on the front frame 16, the clipping part 121 is formed on one side of the upper frame 12, and the holding tab 18 is fixed at one side of the upper frame 12.

In this embodiment, the clipping part 121 of the modular frame 1 is designed attentively, which has a protrusive oriel 122 extended from an edge of the upper frame 12 of the modular frame 1, and a clipping hole 124 is formed on the protrusive oriel 122. Therefore, the protrusive oriel 122 provides a curve and smooth design for preventing scraping and damage to the retaining buckle 28.

In this embodiment, the holding tab 18 has a main part 182, a fixing part 184 formed at one end of the main part 182, and a stopping block 186 formed at another end of the main part 182. The upper frame 12 of the modular frame 1 has a fixing component 126 for fixing the fixing part 184 of the holding tab 18 thereon. The holding tab 18 further has a pressing part 188 protruding from one side of the main part 182, so that the holding tab 18 presses elastically to unlock the modular frame 1 from the stopping part 262 of the housing 2.

There is one thing that deserves special mention in this embodiment. The stopping block 186 of the holding tab 18 is substantially triangle-shaped, and forms a curve and smooth protrusive edge 187 at an edge thereof. Because of the flexibility of the holding tab 18, the stopping block 186 can be stopped at the stopping part 262 of the housing 2. Even if the user does not bend the holding tab 18, the stopping block 186 can escape from the stopping part 262.

The retaining buckle 28 is disposed on the housing 2. In this embodiment, the retaining buckle 28 is made of flexible plastic material, and is engaged with the clipping part 121 of the modular frame 1 when the modular frame 1 is closed down.

The present invention provides especially solid and useful bearings to allow rotation by applying the drawable characteristic of metal processing, which reduces the size of pivotal parts efficiently as well as the size of housing. In this embodiment, one of the pivotal parts 242 of the housing 2 is separated from the housing 2, and is fixed on the front board 24 of the housing 2. Therefore, the pivotal parts 242 can be made independently and conveniently and then assembled to the modular frame 1. In detail, all of the pivotal parts are made by drawing metal pieces to form the bearings matching with the pivotal holes. For example, in this embodiment, the pivotal part 241 is drawn to form a bearing 243 and matches with a pivotal hole 163 formed on the pivotal part 161. The pivotal part 162 is drawn to form a bearing 164 and matches with a pivotal hole 244 formed on the pivotal part 242.

Figure 2:
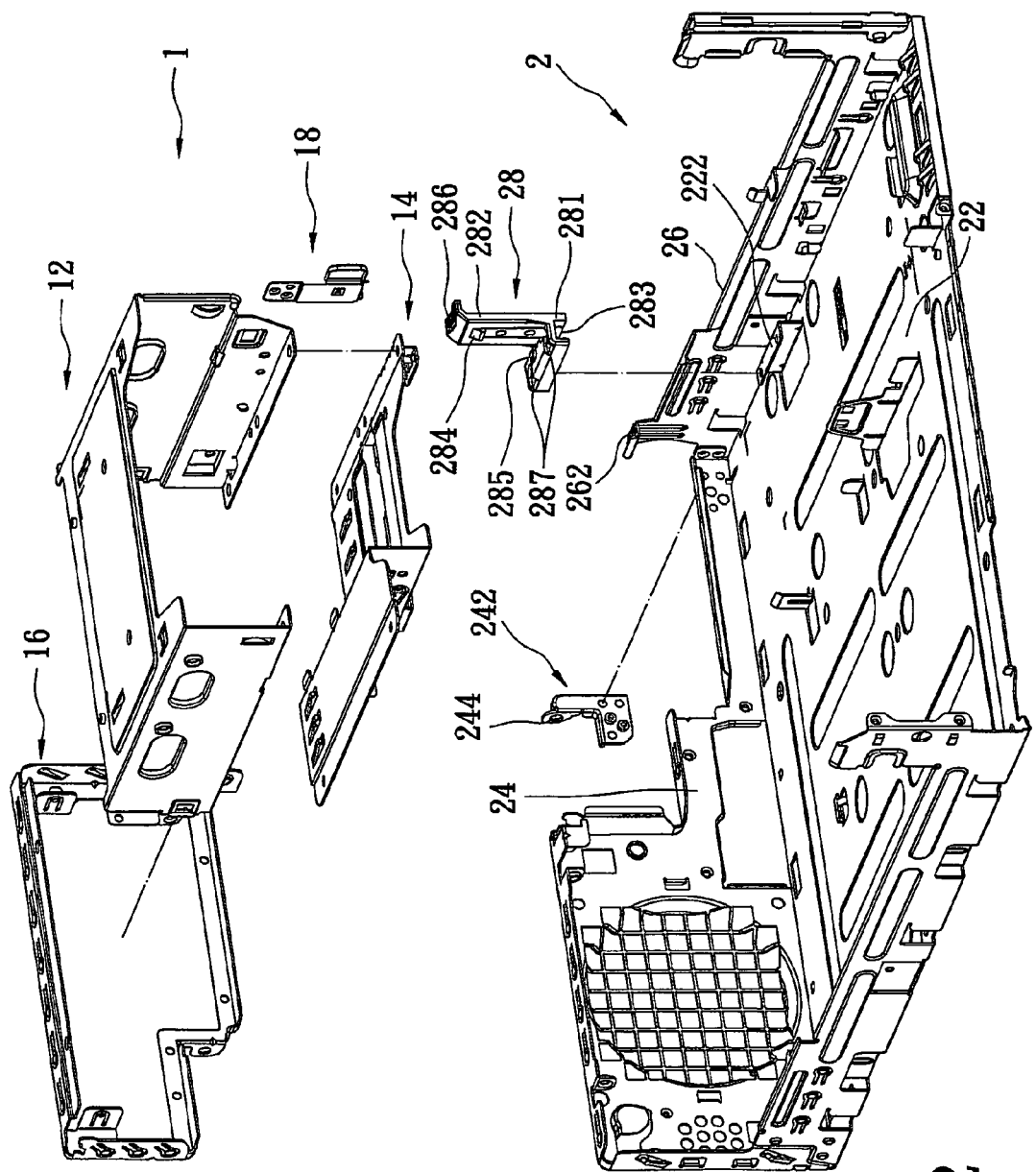
FIG. 2 is another exploded perspective view of the rotational retaining mechanism for storage devices according to the present invention.

Reference is made to FIG. 2. The retaining buckle 28 of the present invention provides a flexible engagement, so that the user can fix and unlock the modular frame 1 conveniently. To fix the retaining buckle 28, the bottom board 22 of the housing 1 forms an inverted L-shaped fixing pedestal 222 formed by punching the bottom board 22. In this embodiment, the retaining buckle 28 has a base part 281 fixed on the fixing pedestal 222 of the bottom board 22, an erective part 282 extended upwardly from the base part 281, and a hook 284 protruded from the erective part 282. The retaining buckle 28 preferably has a wrenching part 286 extended and bended from a top of the erective part 282 for convenient operation.

The base part 281 of the retaining buckle 28 is U-shaped and forms a concave space 283 at a bottom thereof for mounting on the fixing pedestal 222, and forms a pair of fixing holes 287 for being fixed onto the fixing pedestal 222.

Figure 3:
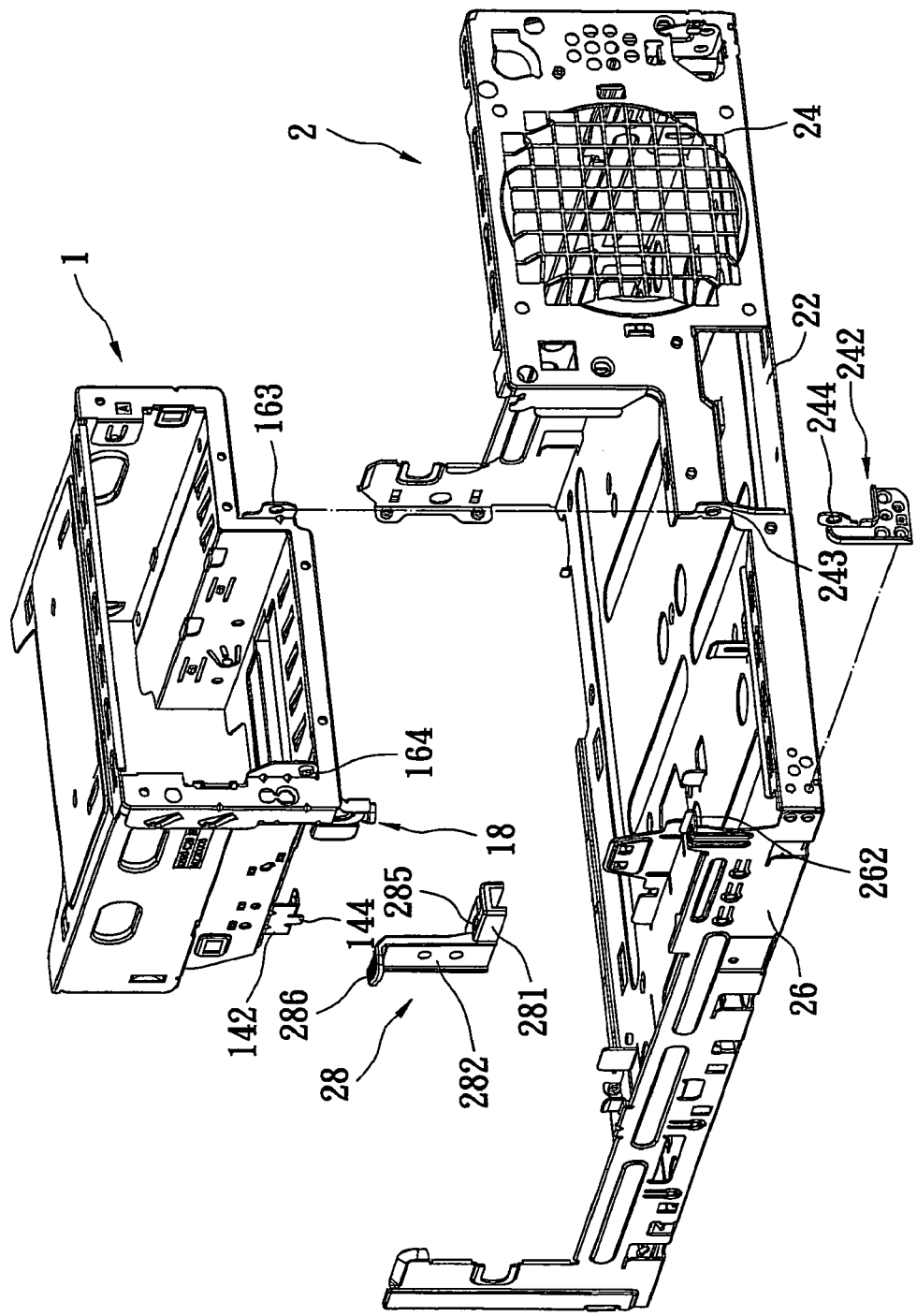
FIG. 3 is a partial exploded perspective view of the rotational retaining mechanism for storage devices according to the present invention.
Figure 4:
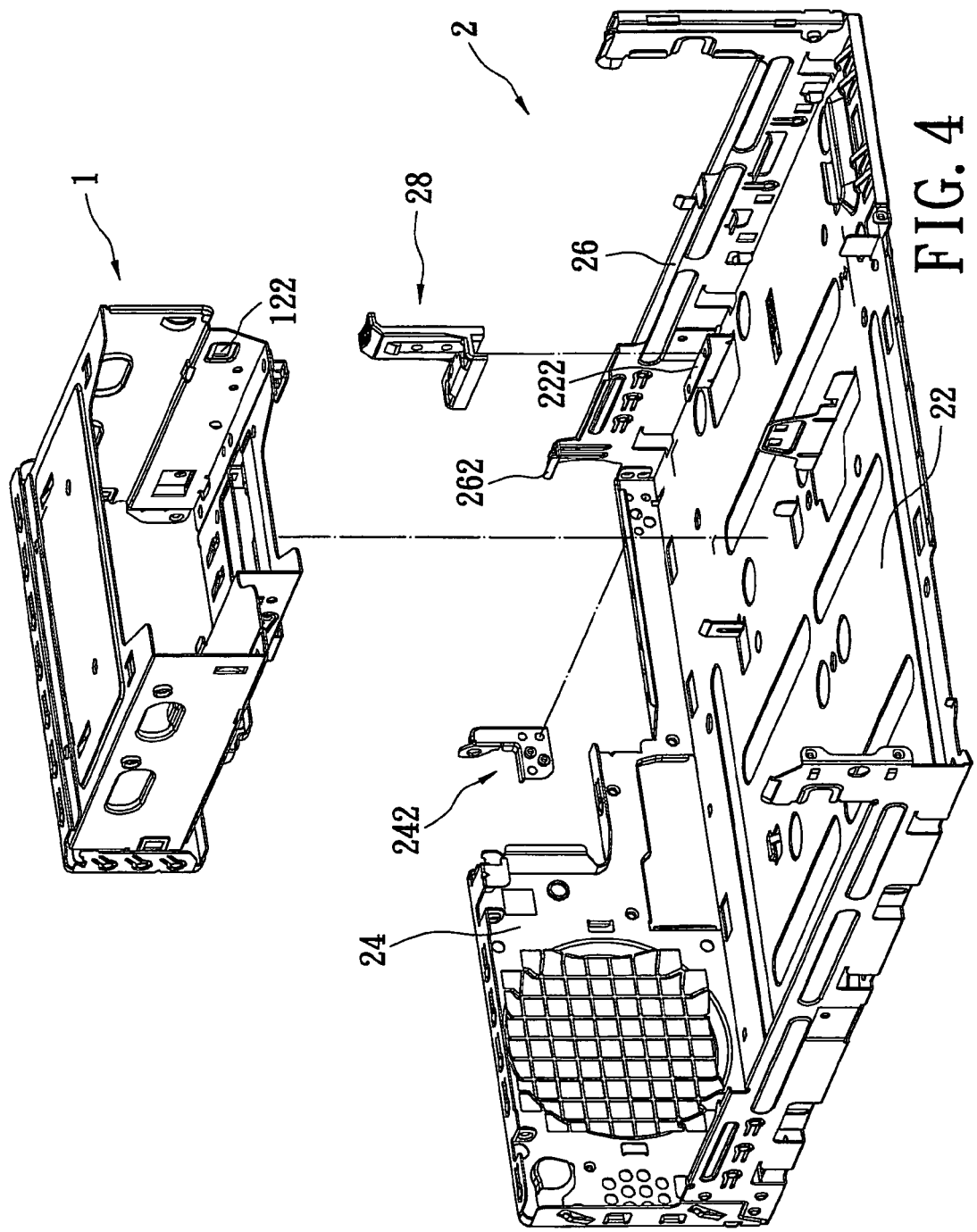
FIG. 4 is another partial perspective view of the rotational retaining mechanism for storage devices according to the present invention.

Reference is made to FIG. 3 and FIG. 4. In this embodiment, the base part 281 forms a fixing hole 285, and the modular frame 1 has an orientating component 142 protruded from a bottom of the lower frame 14. The orientating component 142 is protruded with a tongue 144 that inserts into the fixing hole 285. Therefore, the modular frame 1 can be guided to become orientated and fixed. The FIG. 5A is an assembled perspective view thereof.

Figure 5:
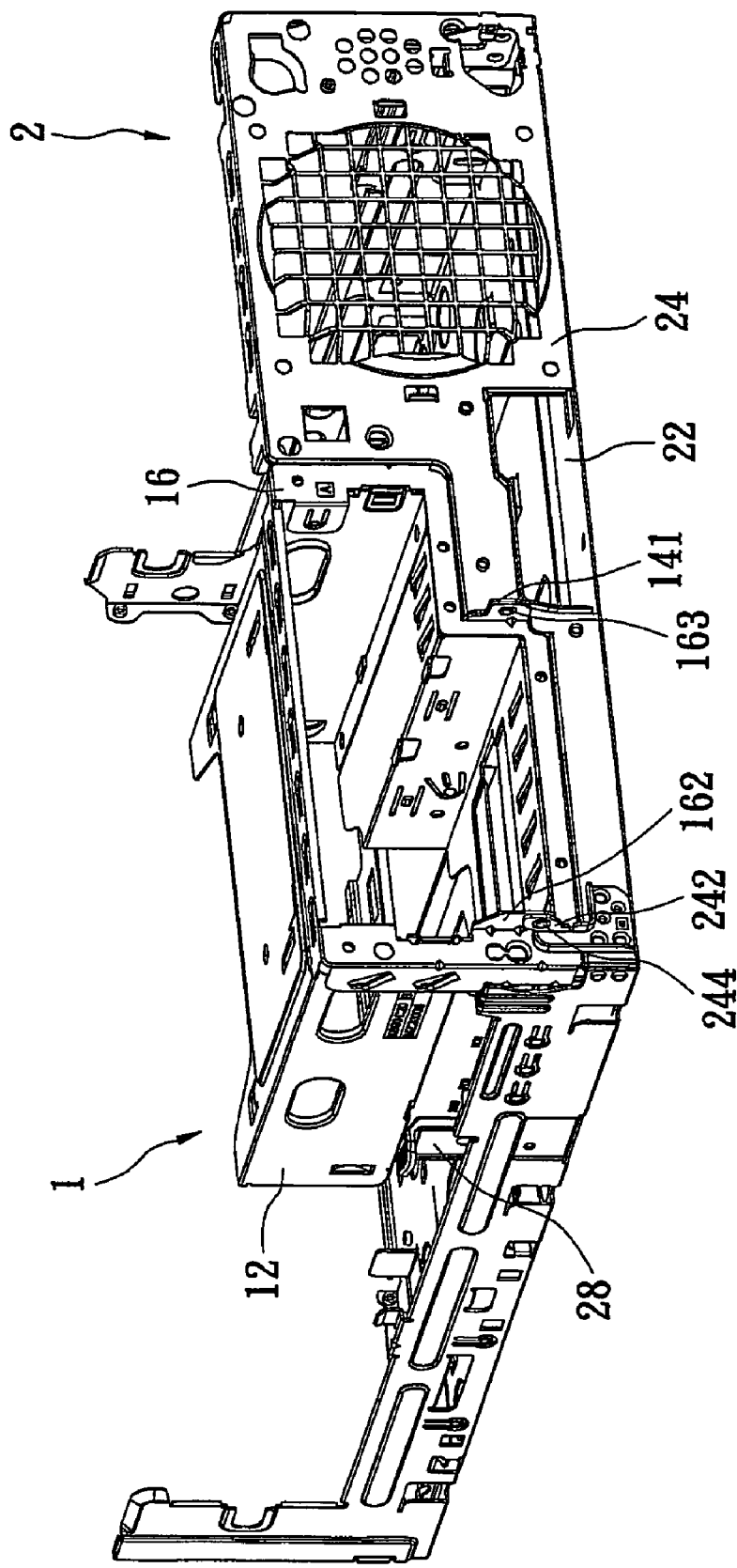
FIG. 5 is an assembled perspective view of the rotational retaining mechanism for storage devices (in a locked condition) according to the present invention.
Figure 5A:
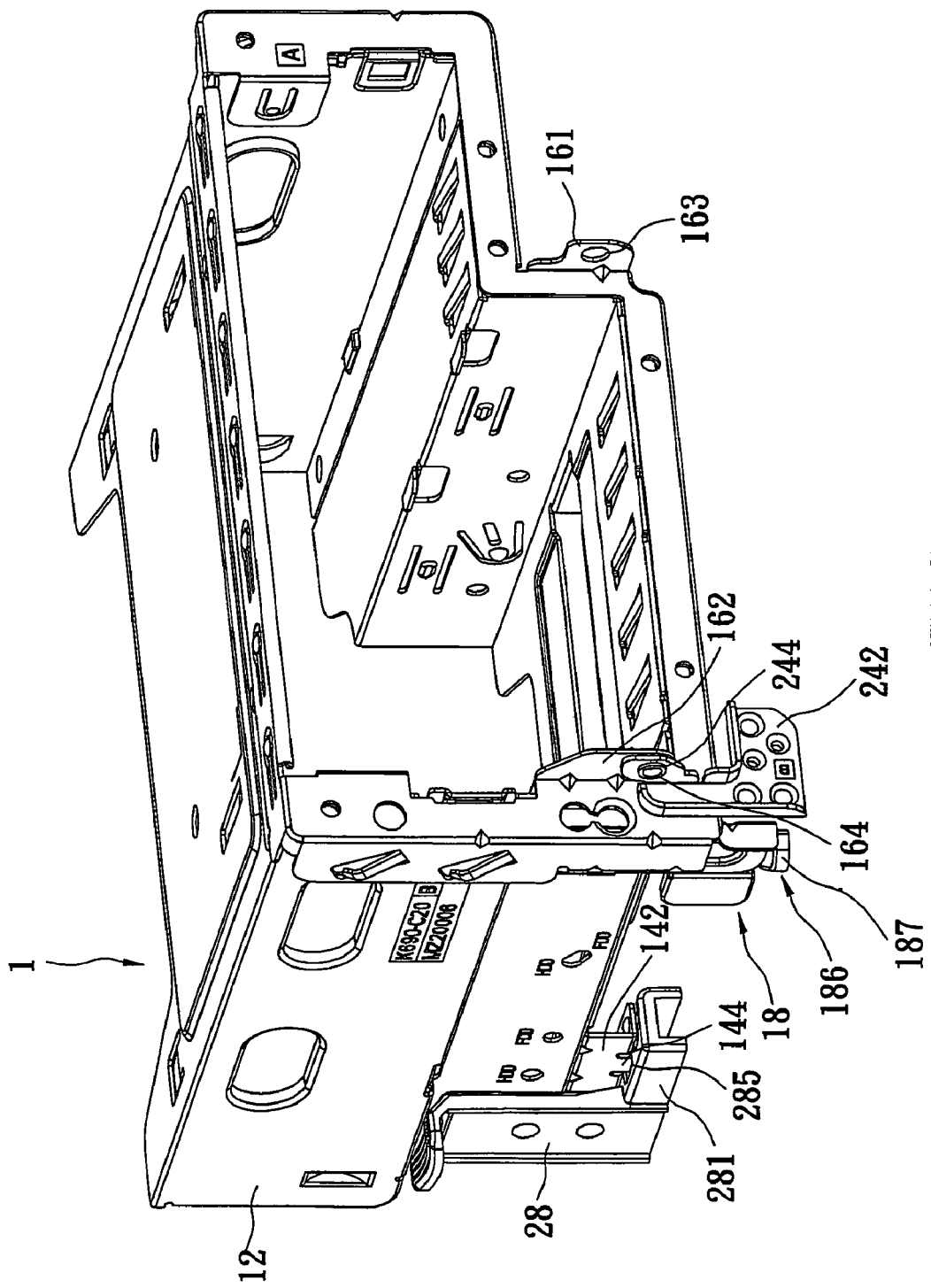
FIG. 5A is an assembled perspective view of a modular frame according to the present invention.
Figure 6:
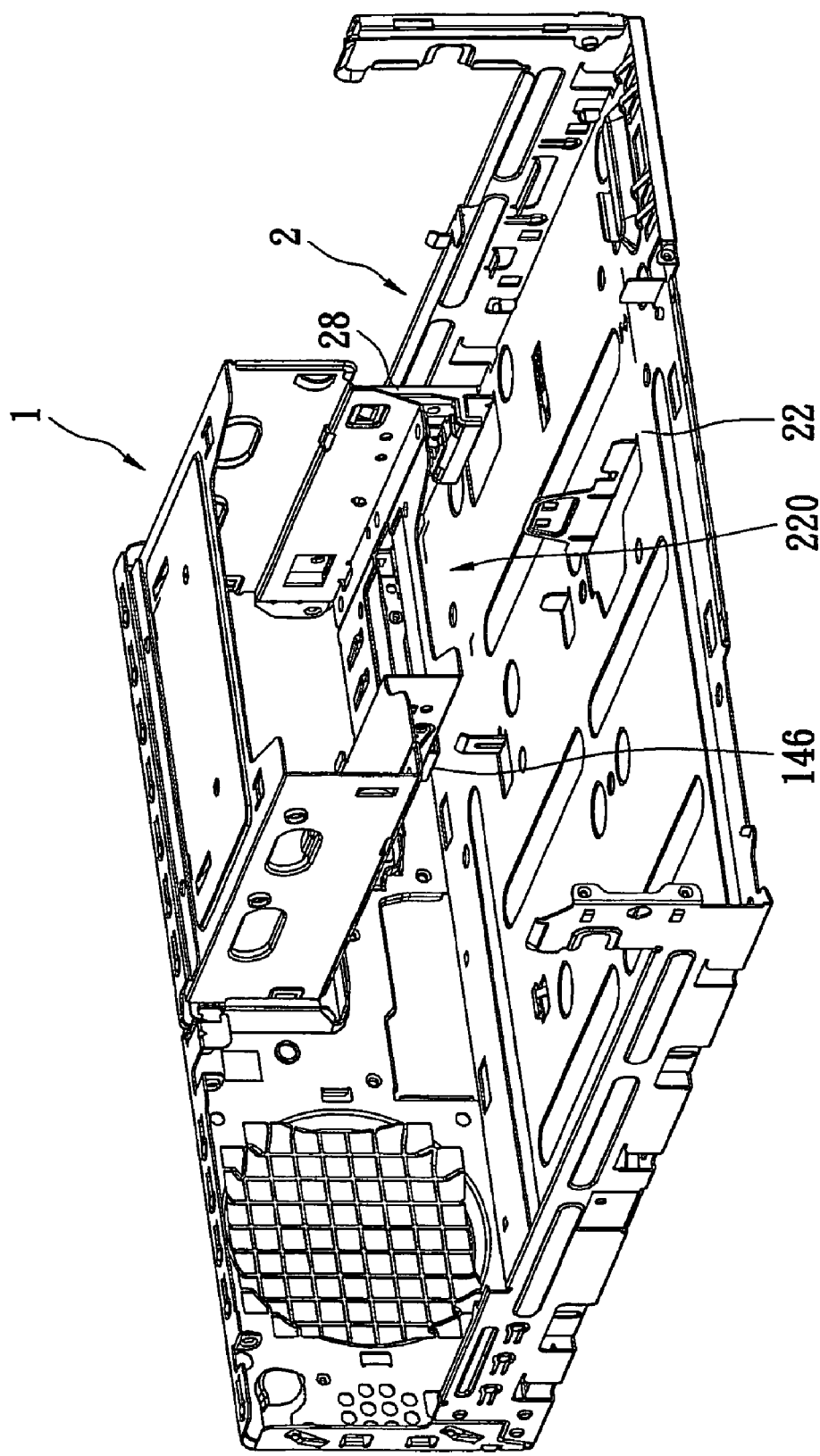
FIG. 6 is another assembled perspective view of the rotational retaining mechanism for storage devices (in a locked condition) according to the present invention.

Reference is made to FIG. 5 and FIG. 6, which are assembled perspective views of the rotational retaining mechanism for storage devices (in a locked condition) according to the present invention. The rotational retaining mechanism for storage devices of the present invention economizes space, without conventional fixing frames. There is only the modular frame 1 with a thickness similar to a metal plate between the storage devices and the housing. The retaining buckle 28 fixes the modular frame 1, for preventing the storage devices from falling down when they are accidentally moved improperly.

Figure 7:
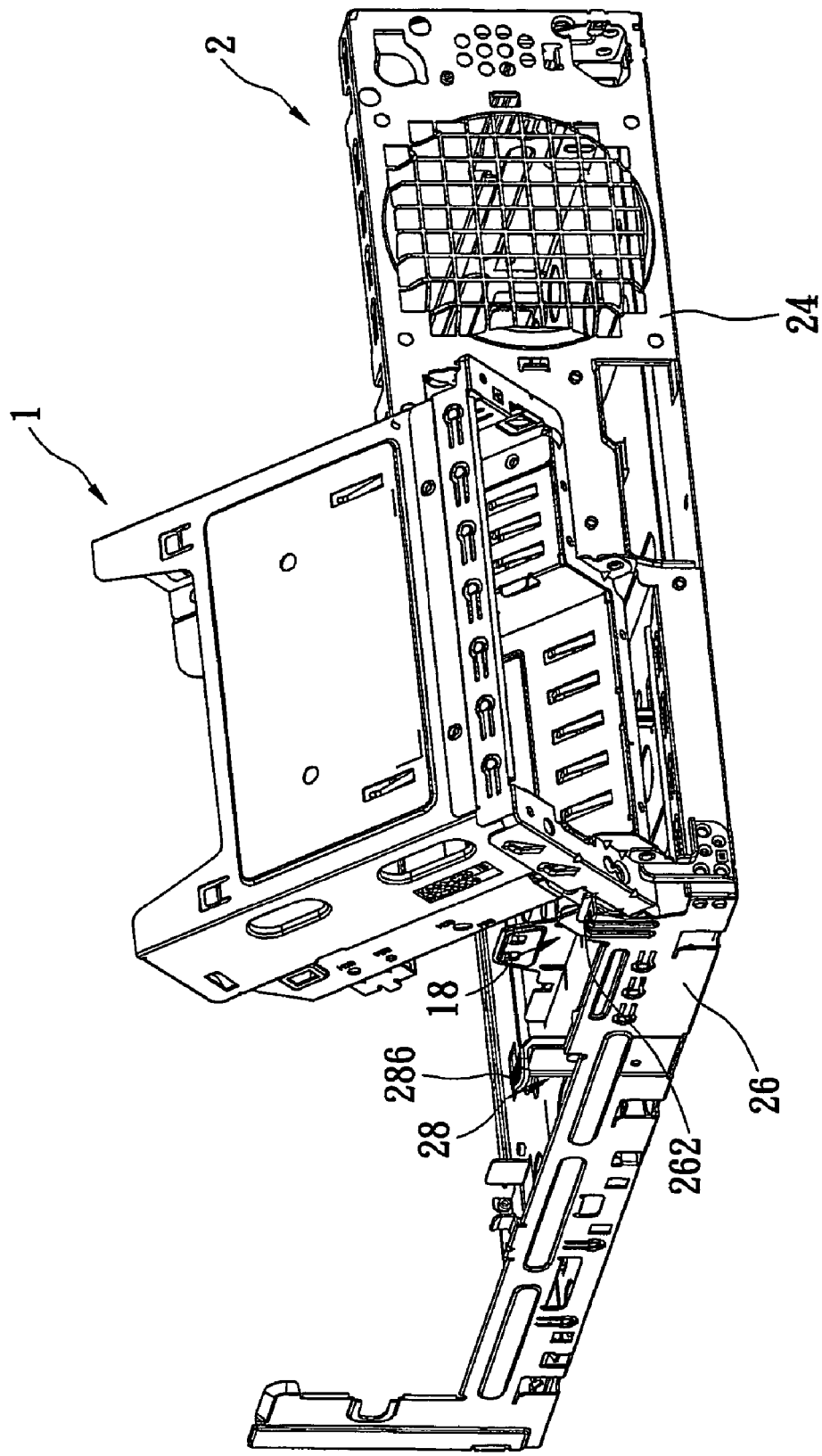
FIG. 7 is an assembled perspective view of the rotational retaining mechanism for storage devices (in a swiveling process) according to the present invention.
Figure 8:
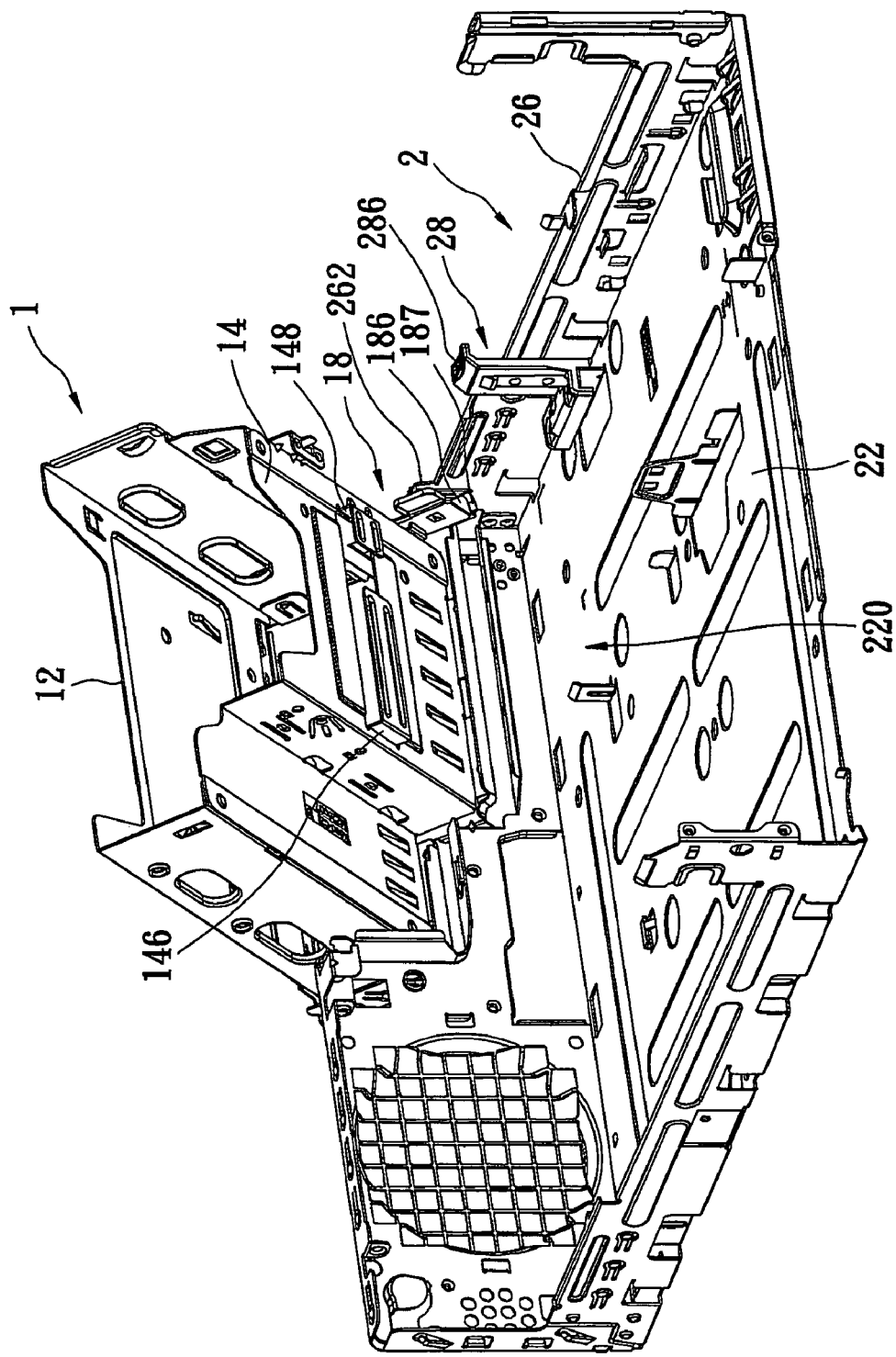
FIG. 8 is another assembled perspective view of the rotational retaining mechanism for storage devices (in a swiveling process) according to the present invention.

Reference is made to FIG. 7 and FIG. 8, which are assembled perspective views of the rotational retaining mechanism for storage devices (in a swiveling process) according to the present invention. Through bending of the retaining buckle 28, the present invention can unlock the storage devices conveniently and easily, so that maintenance and assembly is more efficient. Moreover, the present invention applies a rotatable design, so that the modular frame 1 can rotate to one side of the housing 2 and provides an unoccupied space in the housing 2 assembly or maintenance. The present invention does not need any fixing elements or dismounting of elements, thus avoiding the possibility of losing elements or making it difficult to assemble during unlocking or maintenance.

The present invention has another advantage, as shown in FIG. 8. There is a wire-collecting space 220 that is formed between a bottom of the modular frame 1 and the housing 2, and a wire-collecting device is formed on the bottom of the modular frame 1. In this embodiment, the wire-collecting device is composed of a pair of L-shaped hooking pieces 146, 148. Therefore, all the wires of the storage devices can be received conveniently therein and are artistically pleasing.

Figure 9:
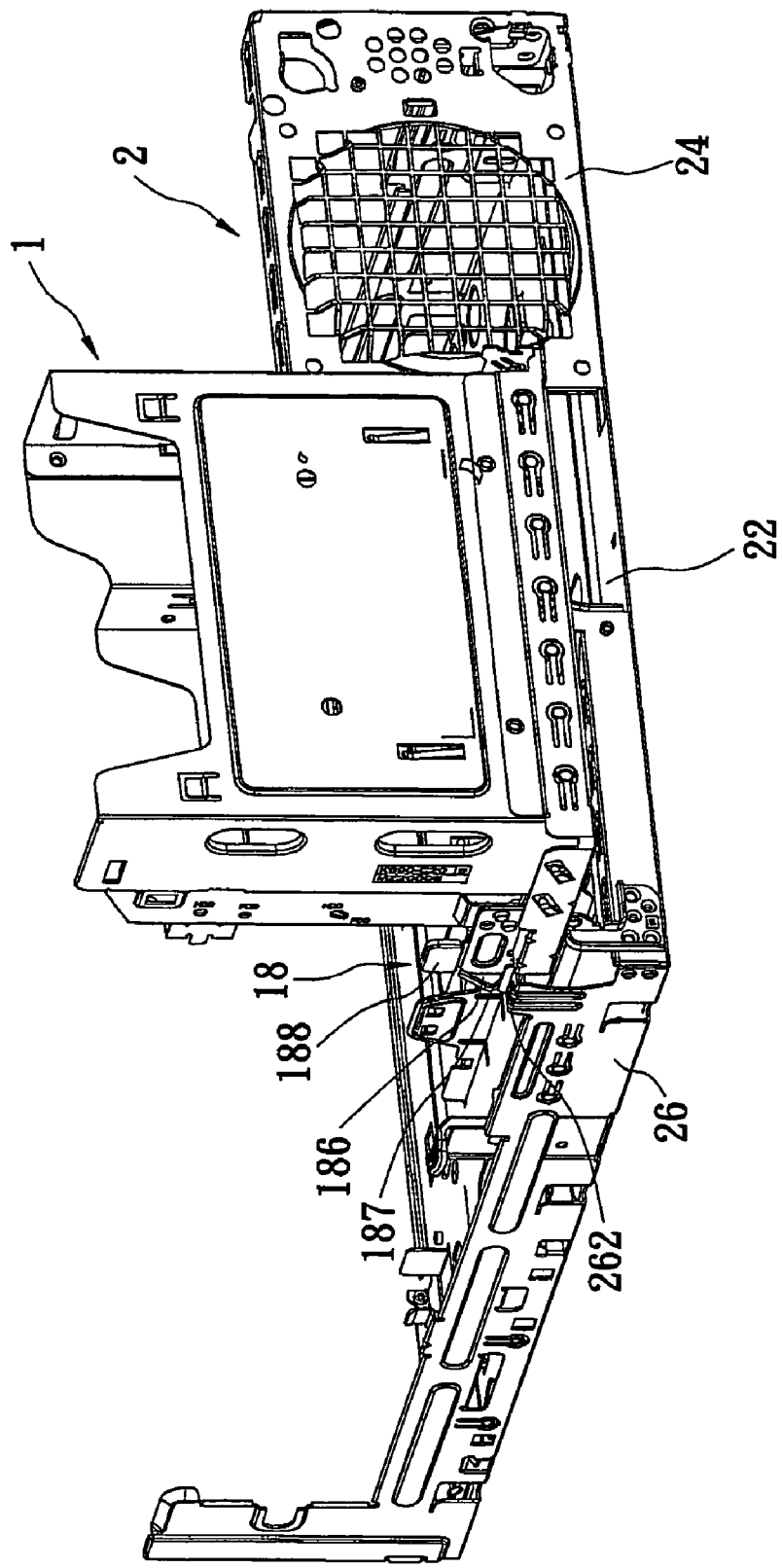
FIG. 9 is an assembled perspective view of the rotational retaining mechanism for storage devices (in an opened condition) according to the present invention.
Figure 10:
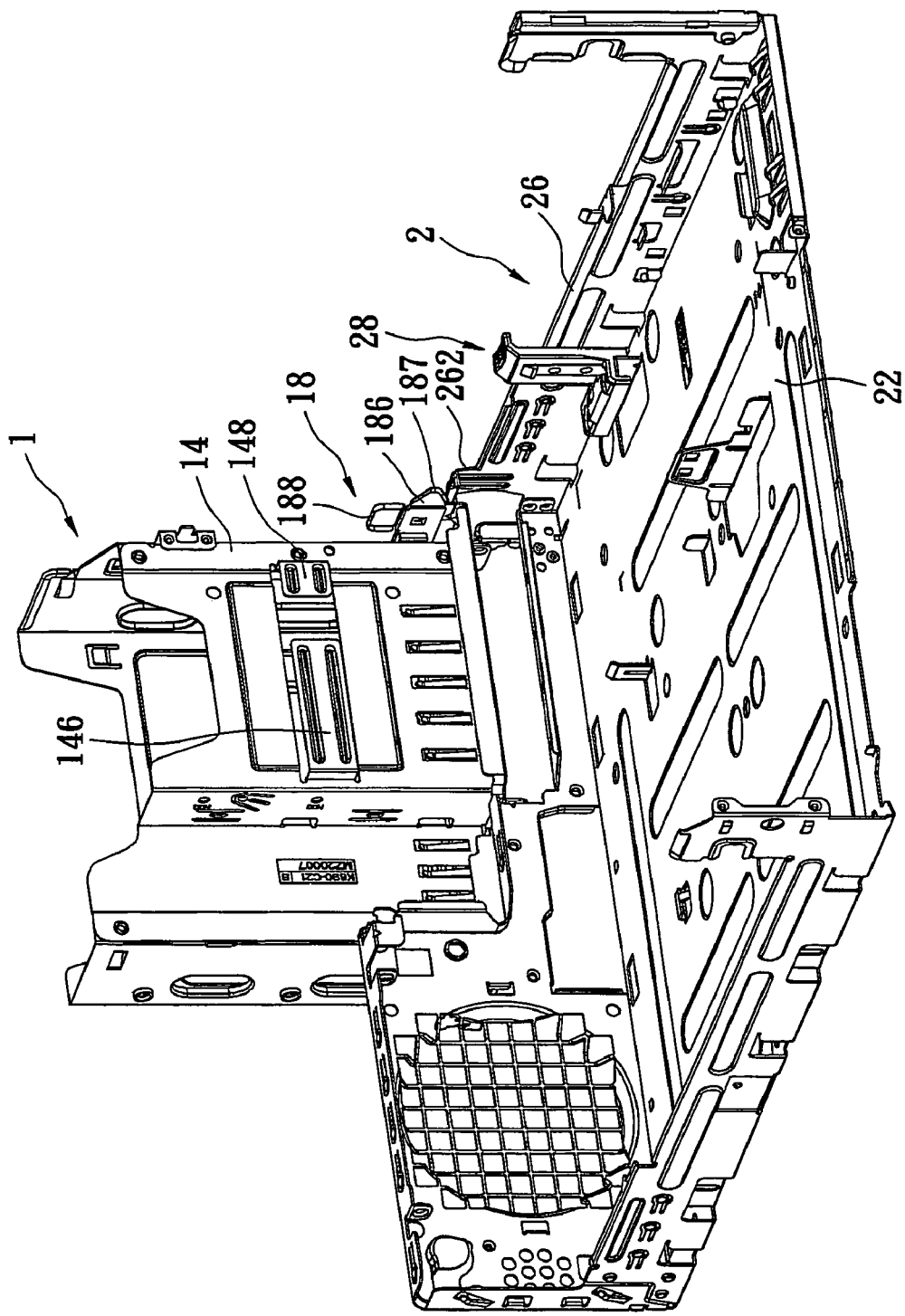
FIG. 10 is another assembled perspective view of the rotational retaining mechanism for storage devices (in an opened condition) according to the present invention.

Reference is made to FIG. 9 and FIG. 10, which are assembled perspective views of the rotational retaining mechanism for storage devices (in an opened condition) according to the present invention. After the modular frame 1 of the present invention is swiveled open, the holding tab 18 can prevent the modular frame 1 from springing back and protect the user from accidental harm due to the modular frame 1 falling down.

After completing maintenance or assembly, the holding tab 18 only needs to be bent and the modular frame 1 can be rotated downwardly to the housing 2. The retaining buckle 28 can engaged with the modular frame 1 automatically for fixing. The storage devices therefore can be locked quickly.

There has thus been described a new, novel and heretofore unobvious rotational retaining mechanism for storage devices which eliminates the aforesaid problem in the prior art. Furthermore, those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A rotational retaining mechanism for storage devices, comprising:
   a housing, having a bottom board, a stopping part protruded upwardly from said bottom board, and a front board protruded from a front edge of said bottom board, said front board having a receiving entry, and a pair of pivotal parts respectively disposed at two sides of said receiving entry;
   a modular frame, receiving at least one storage device therein, and having a pair of pivotal parts protruded from a front edge thereof and pivotally mounted with said pair of pivotal parts of said housing, a holding tab disposed at a side thereof, and a clipping part formed at a side thereof, said holding tab being fixed at said stopping part of said housing when said modular frame is swiveled open, wherein said holding tab engages and locks with said stopping part when said modular frame is swiveled open, to lock the modular frame in an open position; and
   a retaining buckle, mounted on said housing, said retaining buckle being engaged with said clipping part when said modular frame is swiveled closed.

2. The rotational retaining mechanism for storage devices as claimed in claim 1, wherein one of said pivotal parts of said housing is formed separately and is fixed on said front board of said housing.

3. The rotational retaining mechanism for storage devices as claimed in claim 1, wherein each of said pivotal parts is a metal piece formed by drawing.

4. The rotational retaining mechanism for storage devices as claimed in claim 1, wherein said housing has a side board extended upwardly from a side of said bottom board and adjacent to said front board, and said stopping part is protruded upwardly and inwardly from said side board.

5. The rotational retaining mechanism for storage devices as claimed in claim 1, wherein said bottom board of said housing has a fixing pedestal formed on said bottom board and is inverted L-shaped, and said retaining buckle is fixed on said fixing pedestal.

6. The rotational retaining mechanism for storage devices as claimed in claim 1, wherein said retaining buckle has a base part fixed on said bottom board of said housing, an erective part extended upwardly from said base part, and a hook protruded from said erective part.

7. A rotational retaining mechanism for storage devices, comprising:
   a housing, having a bottom board, a stopping part protruded upwardly from said bottom board, and a front board protruded from a front edge of said bottom board, said front board having a receiving entry, and a pair of pivotal parts respectively disposed at two sides of said receiving entry;
   a modular frame, receiving at least one storage device therein, and having a pair of pivotal parts protruded from a front edge thereof and pivotally mounted with said pair of pivotal parts of said housing, a holding tab disposed at a side thereof, and a clipping part formed at a side thereof, said holding tab being fixed at said stopping part of said housing when said modular frame is swiveled open; and
   a retaining buckle, mounted on said housing, said retaining buckle being engaged with said clipping part when said modular frame is swiveled closed, said retaining buckle having a base part fixed on said bottom board of said housing, an erective part extended upwardly from said base part, a hook protruded from said erective part, and a wrenching part extended curvedly from a top of said erective part.

8. A rotational retaining mechanism for storage devices, comprising:
   a housing, having a bottom board, a stopping part protruded upwardly from said bottom board, and a front board protruded from a front edge of said bottom board, said front board having a receiving entry. and a pair of pivotal parts respectively disposed at two sides of said receiving entry;
   a modular frame, receiving at least one storage device therein, and having a pair of pivotal parts protruded from a front edge thereof and pivotally mounted with said pair of pivotal parts of said housing, a holding tab disposed at a side thereof, and a clipping part formed at a side thereof, said holding tab being fixed at said stopping part of said housing when said modular frame is swiveled open; and
   a retaining buckle, mounted on said housing, said retaining buckle being engaged with said clipping part when said modular frame is swiveled closed, said retaining buckle having a base part fixed on said bottom board of said housing, an erective part extended upwardly from said base part, and a hook protruded from said erective part, said base part of said retaining buckle forms a fixing hole, and said modular frame has an orientating component protruded from a bottom thereof, said orientating component protrudes with a tongue for inserting into said fixing hole.

9. The rotational retaining mechanism for storage devices as claimed in claim 1, wherein said clipping part of said modular frame has a protrusive oriel protruded from a side of said modular frame, and a clipping hole formed on said protrusive oriel.

10. The rotational retaining mechanism for storage devices as claimed in claim 1, wherein said modular frame has an upper frame, a lower frame connected to a bottom of said upper frame, and a front frame connected to a front edge of said upper frame and a front edge of said lower frame.

11. The rotational retaining mechanism for storage devices as claimed in claim 10, wherein said pair of pivotal parts of said modular frame respectively bend from two edges of said front frame, and said pair of pivotal parts of said housing are drawn to form a bearing or a pivotal hole.

12. The rotational retaining mechanism for storage devices as claimed in claim 1, wherein said holding tab has a main part with two ends, a fixing part formed at one end of said main part and fixed at one side of said modular frame, and a stopping block form at another end of said main part.

13. The rotational retaining mechanism for storage devices as claimed in claim 12, wherein said stopping block is substantially triangle-shaped and a curved protrusive edge is formed at an edge of said stopping block.

14. The rotational retaining mechanism for storage devices as claimed in claim 13, wherein said holding tab further comprises a pressing part protruded from a side of said main part.

15. The rotational retaining mechanism for storage devices as claimed in claim 1, wherein a wire-collecting space is formed between a bottom of said modular frame and said housing.

16. The rotational retaining mechanism for storage devices as claimed in claim 15, wherein said modular frame has a wire-collecting device, composed of a pair of L-shaped hooking pieces, on the bottom thereof.

* * * * *